(12) United States Patent
Zebregs et al.

(10) Patent No.: US 9,380,556 B2
(45) Date of Patent: Jun. 28, 2016

(54) METHOD AND APPARATUS FOR DETERMINING THE LOCATION OF A SUBSCRIBER

(75) Inventors: Paul Zebregs, Tilburg (NL); Tom Geerts, Chaam (NL); Peter Van Loon, Oosterhout (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/357,651

(22) PCT Filed: Nov. 14, 2011

(86) PCT No.: PCT/EP2011/070052
§ 371 (c)(1),
(2), (4) Date: Jul. 13, 2014

(87) PCT Pub. No.: WO2013/071946
PCT Pub. Date: May 23, 2013

(65) Prior Publication Data
US 2015/0099532 A1    Apr. 9, 2015

(51) Int. Cl.
*H04W 24/00*  (2009.01)
*H04W 64/00*  (2009.01)
*H04W 4/02*   (2009.01)
*H04W 4/20*   (2009.01)
*G01S 5/02*   (2010.01)

(52) U.S. Cl.
CPC ............... *H04W 64/003* (2013.01); *G01S 5/02* (2013.01); *H04W 4/02* (2013.01); *H04W 4/20* (2013.01); *H04W 64/00* (2013.01)

(58) Field of Classification Search
CPC ..... H04W 84/18; H04W 64/00; H04W 12/12; H04W 24/10; H04W 40/20; H04W 40/32; H04W 4/025
USPC .................... 455/456.1, 456.3, 434
See application file for complete search history.

(56) References Cited

U.S. PATENT DOCUMENTS

| 2009/0075651 A1 | 3/2009 | MacNaughtan et al. |
| 2009/0298505 A1 | 12/2009 | Drane et al. |
| 2011/0201355 A1* | 8/2011 | Hansson .................... 455/456.1 |

FOREIGN PATENT DOCUMENTS

WO    2010022470 A1    3/2010

* cited by examiner

*Primary Examiner* — Martin Mushambo
(74) *Attorney, Agent, or Firm* — Murphy, Bilak & Homiller, PLLC

(57) ABSTRACT

A method of determining whether or not a subscriber is located within the vicinity of a Home Zone defined by a geographical coordinate set. The method comprises receiving from a mobile positioning system a shape specifying a location of the subscriber taking into account a degree of uncertainty, and scaling the received shape to account for an extent of the Home Zone vicinity. It is then determined whether or not the Home Zone lies within the scaled shape.

12 Claims, 4 Drawing Sheets

US 9,380,556 B2

METHOD AND APPARATUS FOR DETERMINING THE LOCATION OF A SUBSCRIBER

TECHNICAL FIELD

The present invention relates to location-based applications operated by a service provider and which make use of subscriber location information generated within a wireless access network.

BACKGROUND

A particular growth area within the wider field of wireless access services is that of location-based services. A service provider can use a knowledge of a terminal's location to enhance user experience, to create new and potentially valuable revenue streams for the service providers, and to implement novel subscriber tariffs. The Mobile Location Protocol (MLP) is a protocol specified by the Open Mobile Alliance (OMA) to provide (network-based) applications with location information independently of the underlying network technology [LIF TS 101]. It relies upon the delivery of XML documents containing location information from a mobile location centre within the wireless network to a service provider's server, typically using HTTP as the transport mechanism. 3GPP specifications for wireless network architectures (including GSM, 3G, and LTE) provide for the determination of location information suitable for use with MLP. This 3GPP "system" is referred to here as a Mobile Positioning System (MPS). The MPS is facilitated by a Gateway Mobile Location Centre (GMLC) defined in GSM and UMTS, or possibly by a Mobile Positioning Centre (MPC) which is defined in the American National Standards Institute (ANSI) standards. FIG. 1 illustrates the MLP message exchange involving the Standard Location Immediate Request (SLIR) and Standard Location Immediate Answer (SLIA).

The GMLC (or MPC) returns to the location-based application (of the service provider), a "location area" representing the area where the terminal (or loosely speaking the subscriber) is located. This location area could, for example, be a circle represented by a centre origin and a radius where the origin corresponds to the (inaccurately determined) subscriber location and the radius represents a degree of uncertainty. Services such as so-called 'Home Zone' applications—which compare the actual (assumed) location with pre-set coordinates to apply differentiated charging, mobility restrictions etc.—rely on MPS to request the location of a subscriber.

Many variables determine the accuracy of mobile positioning, including:

The current volume of traffic handled by a radio mast;
Radio interference;
Reflections off tall buildings;
Current weather conditions; and
Radio planning (e.g. mast density in urban versus rural areas)

As such, the location areas provided by MPS for subscribers can be inaccurate. Another variable that is often overlooked is the accuracy of the coordinates stored by the location-based application (e.g. Home Zone) that are to be compared against the MPS location areas. These coordinates may be provided by the 3GPP network operator, or by a third party (e.g. based upon GPS coordinates) and guarantees as to their accuracy cannot always be given. In some cases, the stored coordinates are themselves generated by the MPS and are therefore subject to the inaccuracies of MPS. This could happen when coordinates are recorded when a subscriber designates a Home Zone using some terminal-based selection process, whereupon the MPS logs the subscriber's current position and passes this to the service provider.

SUMMARY

It is an object of the invention to obviate at least some of the above disadvantages and provide for an improved method and system to determine the location of a subscriber with respect to his/hers Home Zone.

According to a first aspect of the present invention there is provided a method of determining whether or not a subscriber is located within the vicinity of a Home Zone defined by a geographical coordinate set. The method comprises receiving from a mobile positioning system a shape and origin specifying a location area for the subscriber taking into account a degree of uncertainty, and scaling the received location area to account for an extent of the Home Zone vicinity. It is then determined whether or not the Home Zone lies within the scaled location area.

Embodiments of the present invention provide a relatively simple and efficient mechanism for determining whether or not a subscriber (of some service that makes use of a subscriber's location) is currently at home. There is no need to perform a complex analysis of the overlap of two shapes, e.g. one provided by the MPS and the other held by the application for the subscriber, or subscriber group.

A particular application of the invention involves those cases where the mobile positioning system is implemented in accordance with the Mobile Location Protocol. Other protocols, including updates to the currently specified MLP may be employed.

The method may be carried out within a wireless telecommunication network, or at some location (e.g. server) outside such a network, e.g. at a server coupled to the Internet.

According to a second aspect of the present invention there is provided a server for determining whether or not a subscriber is located within the vicinity of a Home Zone defined by a geographical coordinate set. The server comprises a receiver for receiving from a mobile positioning system a shape and origin specifying a location area for the subscriber taking into account a degree of uncertainty, and a processor for scaling the received location area to account for an extent of the Home Zone vicinity. The server further comprises a comparator for determining whether or not the Home Zone lies within the scaled location area.

DETAILED DESCRIPTION

As has been discussed above, a Mobile Positioning System (MPS) employing the Mobile Location Protocol (MLP) will provide to a requesting application a location area defining a geographical area in which a subscriber is most probably located. The application, operated by a service provider providing some location-dependent service, may use the location area returned by the MPS in order to provision a service to the subscriber, to apply an appropriate charging model, or for some other purpose.

In the case of a so-called "Home Zone" application, a service provider will want to know if the subscriber is currently located at some predefined co-ordinates, i.e. if the subscriber is at home. Typically, the Home Zone application would receive the location area for the subscriber from the MPS and determine whether or not the Home Zone coordinates lie within the location area. If so, then the subscriber is assumed to be at home. This determination is a relatively simple procedure, and has the advantage that it is likely to take into account, at least to some extent, the fact that the Home Zone has some limited geographical spread, e.g. a home and garden. The "allowed" spread will correspond to the uncertainty implicit in the MPS location area.

It has been recognised that in many cases the spread allowed for by the MPS location area will not map with sufficient accuracy to the spread of the Home Zone. Consider for example the case where a subscriber lives on a farm or very large property. His or her home zone should be large enough to reflect the size of the property and it is unlikely that the MPS location area will be sufficiently large. In other cases, e.g. where a subscriber lives in a small apartment, the MPS location area may be too large.

This problem may be solved by predefining a Home Zone shape appropriate to the subscriber's property. When an MPS location area is received, it is determined whether or not the predefined shape and the MPS location area overlap. This can however present a relatively complex problem, especially for complex shapes.

An alternative solution proposed here is to continue to define the Home Zone by a simple coordinate set, and to scale the returned MPS location area by some appropriate factor (or factors). This factor can be set on a per subscriber basis or, for example, based upon a residential area type (e.g. urban versus rural). [Of course more complex scaling formulae can be utilised.] It is then simply a matter of determining whether or not the Home Zone coordinate set lies within the scaled MPS location area.

Figure 1:
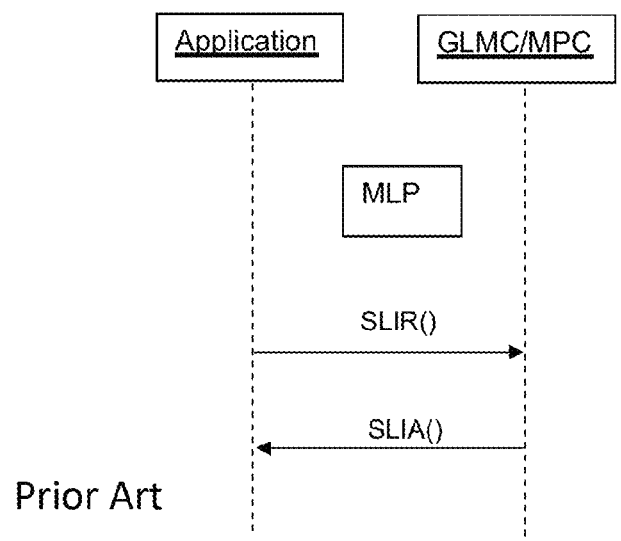
FIG. 1 illustrates schematically a simple message exchange according to the Mobile Location Protocol (MLP)
Figure 2:
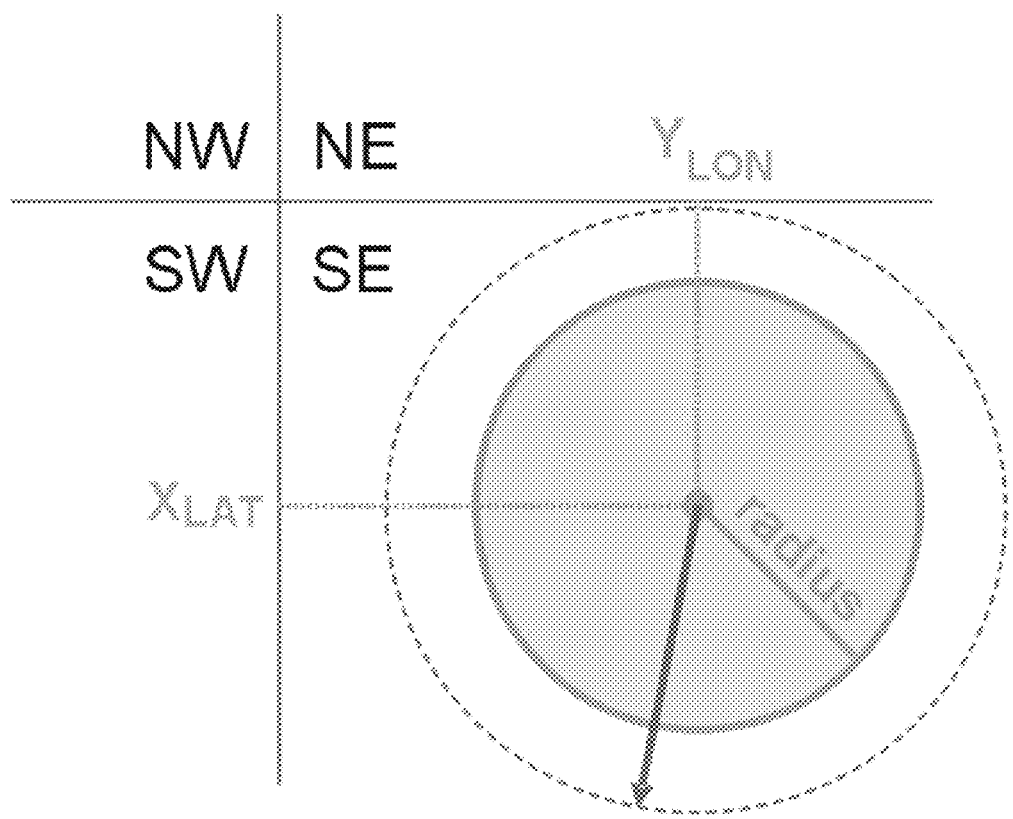
FIG. 2 illustrates schematically a circular location area according to the MPL, and the up-scaling of this location area to take account of a Home Zone vicinity.

The MPS location area is extended by the use of a multiplier, referred to here as the 'f-factor'. The factor is applied differently per location area as returned by the MPS. The three most common MLP location area shapes are:
CircularArea
EllipticalArea
CircularArc The circle (CircularArea) is the simplest location area shape. In this case, the MPS simply returns the geographical coordinates (e.g. longitude and latitude) of the center of the circle shape, along with its radius. To extend the coverage of the circle shape, the radius is multiplied by the f-factor. For example, if the f-factor is set to a value of 1.2, then the radius of the circle is extended by 20%. This is illustrated in FIG. 2. Note that the f-factor can also be set to a value between 0 and 1, thereby decreasing the radius of the circle.

Figure 3:
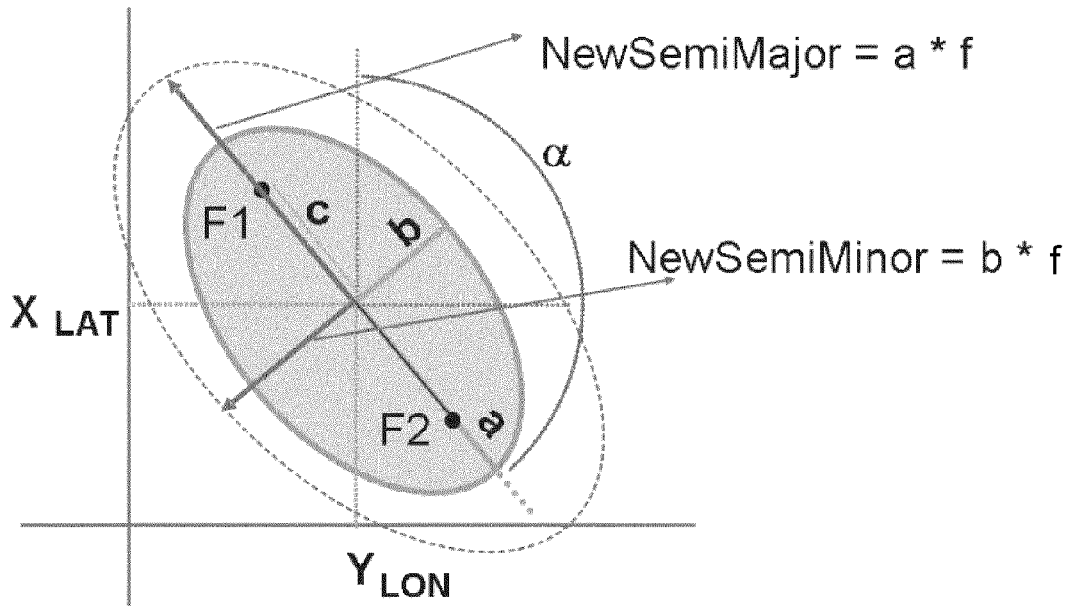
FIG. 3 illustrates schematically an elliptical location area according to the MPL, and the up-scaling of this location area to take account of a Home Zone vicinity.

An ellipse (EllipticalArea) is defined by the coordinates of the center of the shape, along with the sizes of the semi-minor axis and the semi-major axis. Furthermore, an angle is provided by the MPS, providing information on the rotation of the ellipse. To extend the coverage of the ellipse shape, the sizes of the semi-minor and semi-major axes are multiplied by the f-factor. The same f-factor is be used for both axes in order to retain the shape of the ellipse. This is illustrated in FIG. 3, where the semi-major and semi-minor axes of the returned shape are a and b respectively. Again, the f-factor can be set to a value between 0 and 1, thereby decreasing the size of the ellipse.

A circular arc shape (CircularArc) is defined by the coordinates of the shape's origin, along with the inner and outer radius, and a "start" and "stop" angle. To extend the coverage of the circular arc shape, a multiplier is applied to the radius, and another factor is applied to the angles. To apply the multiplier factor to the radius, the mid-radius is calculated as the average between the inner and outer radii. Based on the mid radius and the f-factor, the new inner and outer radius can be calculated as:

Mid Radius=(Inner Radius+Outer Radius)/2

New Outer Radius=Mid Radius+((Outer Radius−Mid Radius)×$f$-factor)

New Inner Radius=MAX(Mid Radius+((Inner Radius−Mid Radius)×$f$-factor),0).

Figure 4:
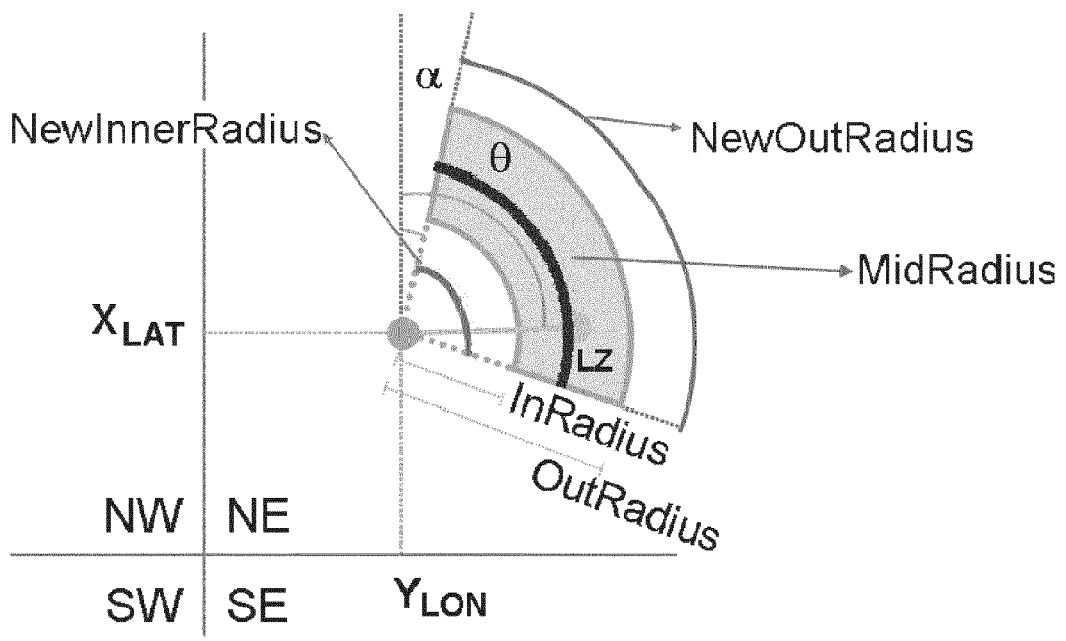
FIG. 4 illustrates schematically a circular arc location area according to the MPL, and the radial up-scaling of this location area to take account of a Home Zone vicinity.

This is illustrated in FIG. 4.

Figure 5:
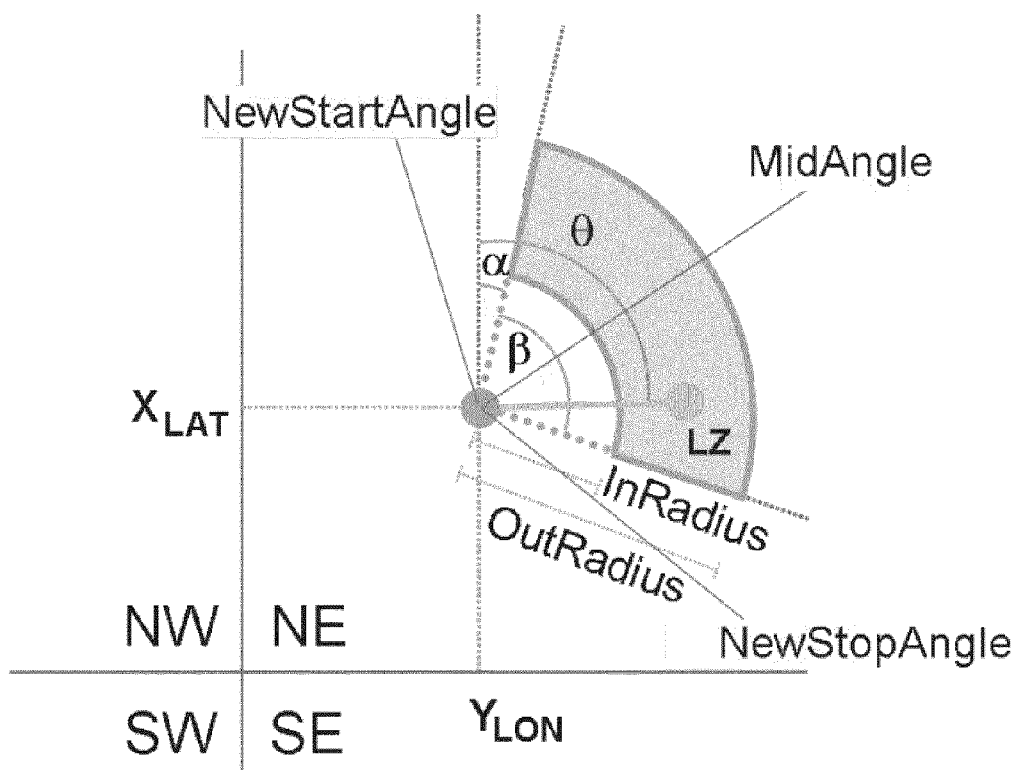
FIG. 5 illustrates further the circular arc location area of FIG. 4, and the angular up-scaling of this location area to take account of a Home Zone vicinity.

A similar method is to applied in order to scale the angles, using a second f-factor. First, the mid-angle is defined, and then the new start and stop angles are determined. This is illustrated in FIG. 5. [Note that, according to MLP, the stop angle (represented by β in FIGS. 4 and 5) represents the number of degrees from the start angle, i.e. not from the axis]. The scaled start and stop angles are calculated as follows:

Mid Angle=Start Angle+(Stop Angle/2)

NewStartAngle=MOD((MidAngle+((StartAngle−MidAngle)*$f$-factor)),360)

NewStopAngle=MIN(StopAngle*$f$-factor,360).

The mobile positioning shape centre and the Home Zone coordinate are likely to be specified in latitude/longitude format. The distance, d, between the MPS location area centre and the Home Zone coordinates may be calculated be means of the Haversine formula, i.e.:

$a=\sin^2(\Delta lat/2)+\cos(lat_1).\cos(lat_2).\sin^2(\Delta long/2)$ $c=2.a\tan 2(\sqrt{a},\sqrt{(1-a)})$ $d=R.c.$ The following is a Javascript function that returns the distance in meters between two such coordinates.

```
/*
 * Calculate the distance between two coordinates in m.
 */
function calculateDistance(latitude1, longitude1, latitude2, longitude2)
{
    var R = 6371000.7900
    var dLat = (latitude2−latitude1).toRad( );
    var dLon = (longitude2−longitude1).toRad( );
    var a = Math.sin(dLat/2) * Math.sin(dLat/2) +
        Math.cos(latitude1.toRad( )) *
        Math.cos(latitude2.toRad( )) *
```

-continued

```
        Math.sin(dLon/2) * Math.sin(dLon/2);
    var c = 2 * Math.atan2(Math.sqrt(a), Math.sqrt(1−a));
    var d = R * c;
    return d;
}
```

The bearing between the location area center and the Home Zone coordinates may also be calculated be means of the Haversine formula:

$$\theta = a\tan 2(\sin(\Delta long).\cos(lat_2),$$

$$\cos(lat_1).\sin(lat_2)-\sin(lat_1).\cos(lat_2).\cos(\Delta long))$$

The following is a Javascript function that returns the initial bearing (forward azimuth) between two such coordinates. In mobile positioning applications that use relatively short distances, the initial bearing and final bearing have very similar values. Therefore one can assume in such cases that the initial bearing is the overall bearing.

```
/*
 * Calculate the bearing between two coordinates
 */
function calculateBearing(latitude1, longitude1, latitude2, longitude2)
{
    var dLat = (latitude2−latitude1).toRad( );
    var dLon = (longitude2−longitude1).toRad( );
    var y = Math.sin(dLon) * Math.cos(latitude2.toRad( ));
    var x = Math.cos(latitude1.toRad( ))*Math.sin(latitude2.toRad( )) −
        Math.sin(latitude1.toRad( ))*Math.cos(latitude2.-
        toRad( ))*Math.cos(dLon);
    var brng = Math.atan2(y, x).toDeg( );
    brng = (brng + 360.0) % 360.0;
    return brng;
}
```

Using the distance between the Home Zone coordinates and the centre of the MPS location area, and optionally the bearing considered above, it is relatively straightforward to determine whether or not the Home Zone lies within the scaled location area.

Figure 6:
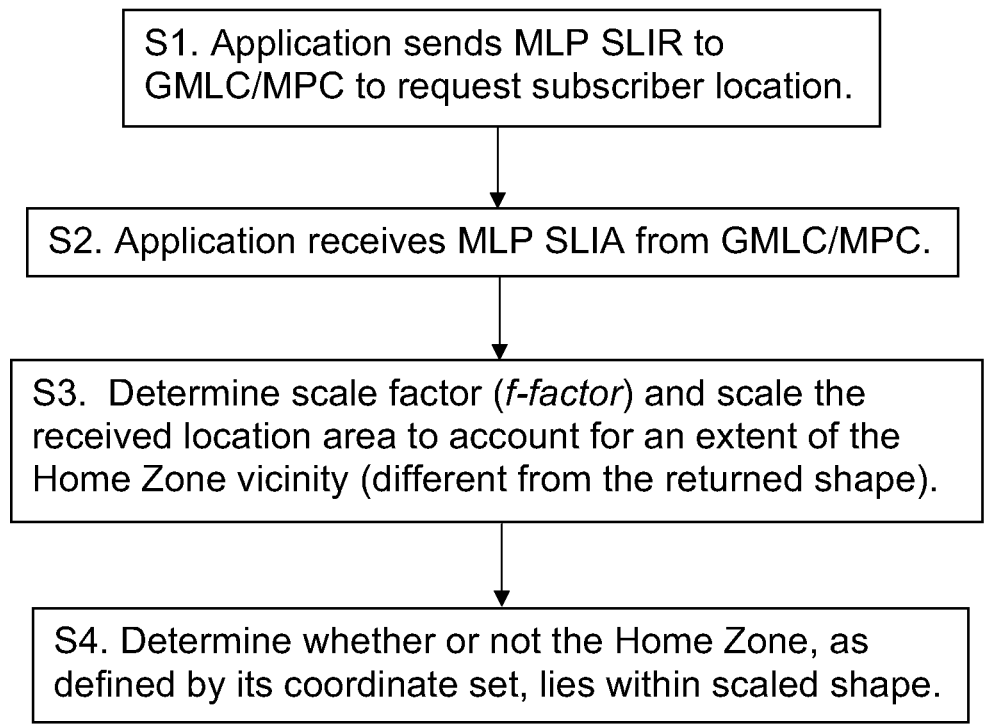
FIG. 6 is a flow diagram illustrating a process for determining whether or not a subscriber is at home.

FIG. 6 is a flow diagram illustrating the overall process performed by the location-based applications. At step S1, the application, e.g. resident on a server operated by a service provider, sends a location information request (SLIR) to the GMLC/MPC and receives therefrom at step S2 a location response (SLIA). At step S3, the application determines a scale factor (e.g. the f-factor) for the subscriber in question, e.g. from a subscriber database, and scales the location area received in the MLP response. This takes into account the variation in extent between that location area and the Home Zone vicinity. At step S4, the application uses the scaled location area to determine whether or not the Home Zone centre lies within the scaled location area. This allows, e.g. the application to determine whether or not the subscriber is currently at "home".

Figure 7:
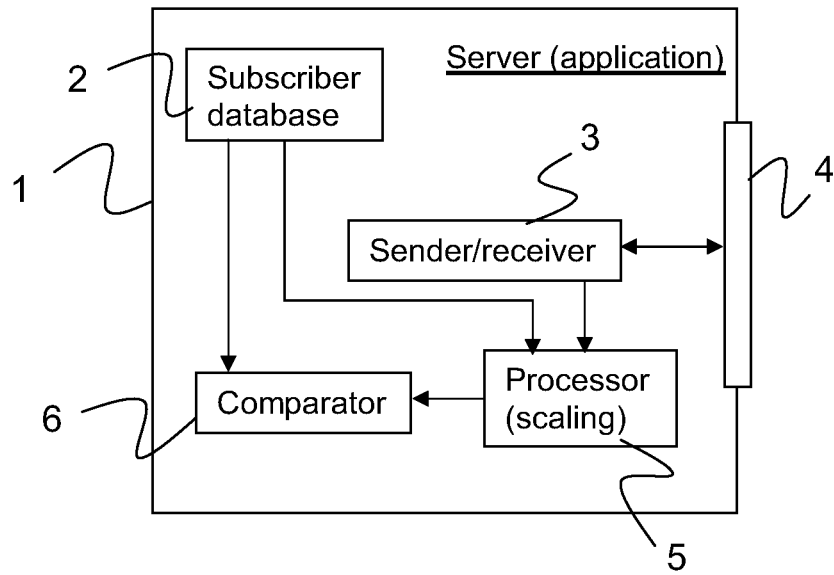
FIG. 7 illustrates a (network) server for performing the process of FIG. 6.

Referring now to FIG. 7, this illustrates schematically a server 1 hosting a location-based application as discussed above. The server comprises a subscriber database 2 which holds subscriber data including, for example, subscriber identities and subscription details. The database may include, for each subscriber, a Home Zone defined by a set of geographic coordinates, e.g. a longitude and latitude. Certain services may be triggered/inhibited when a subscriber is determined to be at home, or away from home. Each Home Zone is associated with a scaling factor, f-factor.

The server is provided with a sender/receiver 3 that is responsible for sending location requests to, and receiving location answers from, a GMLC/MLC (server) via an interface 4. A location answer, including the returned location shape, is passed to a processor 5 for scaling. Scaling is carried out using a scaling factor retrieved from the subscriber database (or possibly using some generic or group factor). The scaled location area is then passed to a comparator 6 which is responsible for determining whether the Home Zone centre (retrieved from the subscriber database) lies within the scaled location area. If the answer is yes, the comparator generates a result indicating that the subscriber is at home, and appropriate (service) actions are applied. Both the processor and the comparator are configured according to the shape provided by the MPS, and according to the algorithm used to determine whether or not the subscriber is at home.

The procedures discussed above provide an extremely simple and efficient mechanism determine whether or not a subscriber is currently at home. Simply by scaling the received location area, up or down, by some factor or factors, the location area can be mapped to some home zone specified for the subscriber.

It will be appreciated by the person of skill in the art that various modifications may be made to the above described embodiments without departing from the scope of the present invention.

The invention claimed is:

1. A method of determining whether or not a subscriber is located within the vicinity of a Home Zone defined by a geographical coordinate set, the method comprising:
   receiving from a mobile positioning system a shape and origin specifying a location area for the subscriber taking into account a degree of uncertainty;
   scaling the received location area to account for an extent of the Home Zone vicinity; and
   determining whether or not the Home Zone lies within the scaled location area, by determining a distance and/or angular difference between the geographical coordinate set defining the Home Zone center and the origin of the received location area.

2. The method according to claim 1, wherein said mobile positioning system is implemented in accordance with the Mobile Location Protocol.

3. The method according to claim 1, wherein said shape is a circle and said step of scaling comprises scaling the radius by a factor defined for the subscriber or for a group to which the subscriber belongs.

4. The method according to claim 1, wherein said shape is an ellipse and said step of scaling comprises scaling the semi-minor and semi-major axes by a factor defined for the subscriber or for a group to which the subscriber belongs.

5. The method according to claim 1, wherein said shape is a circular arc and said step of scaling comprises scaling the inner and outer radii of the circular arc by a first factor and scaling the start and stop angles of the circular arc by a second factor, the first and second factors being defined for the subscriber or a for group to which the subscriber belongs.

6. The method according to claim 5, said step of scaling the radii comprises calculating the new inner radius and outer radius as follows:

Mid Radius=(Inner Radius+Outer Radius)/2

New Outer Radius=Mid Radius+((Outer Radius−Mid Radius)×f-factor)

New Inner Radius=MAX(Mid Radius+((Inner Radius−Mid Radius)×f-factor),0), where f-factor represents the first factor.

7. The method according to claim 5, said step of scaling the start and stop angles comprising calculating the new start and stop angles as follows:

Mid Angle=Start Angle+(Stop Angle/2)

NewStartAngle=MOD((MidAngle+((StartAngle−MidAngle)*f-factor)),360)

NewStopAngle=MIN(StopAngle*f-factor,360), where f-factor represents the second factor.

8. The method according to claim 1, wherein the distance is calculated as follows:

$a=\sin^2(\Delta lat/2)+\cos(lat1).\cos(lat2).\sin^2(\Delta long/2)$ $c=2.a \tan 2(\sqrt{a},\sqrt{(1-a)})$ distance=$R.c$, where Δlat and Δlong are the difference between the longitudes and latitudes of the Home Zone center and location area origin respectively, and lat1 and lat2 are the latitudes of the Home Zone center and location area origin.

9. A server for determining whether or not a subscriber is located within the vicinity of a Home Zone defined by a geographical coordinate set, the server comprising:

a receiver for receiving from a mobile positioning system a shape and origin specifying a location area for the subscriber taking into account a degree of uncertainty;

a processor for scaling the received location area to account for an extent of the Home Zone vicinity; and a comparator for determining whether or not the Home Zone lies within the scaled location area, by determining a distance and/or angular difference between the geographical coordinate set defining the Home Zone center and the origin of the received location area.

10. The server according to claim 9, wherein said shape is a circle and said processor is configured to scale the radius by a factor defined for the subscriber or for a group to which the subscriber belongs.

11. The server according to claim 9, wherein said shape is an ellipse and said processor is configured to scale the semi-minor and semi-major axes by a factor defined for the subscriber or for a group to which the subscriber belongs.

12. The server according to claim 9, wherein said shape is a circular arc and said processor is configured to scale the inner and outer radii of the circular arc by a first factor and scale the start and stop angles of the circular arc by a second factor, the first and second factors being defined for the subscriber or a for group to which the subscriber belongs.

* * * * *